United States Patent
Hosea et al.

(10) Patent No.: US 9,846,769 B1
(45) Date of Patent: Dec. 19, 2017

(54) IDENTIFYING A REMOTE IDENTITY REQUEST VIA A BIOMETRIC DEVICE

(75) Inventors: Frank Hosea, Murray, UT (US); Scott Hillyard, Nibley, UT (US)

(73) Assignee: Crimson Corporation, Dover, DE (US)

( * ) Notice: Subject to any disclaimer, the term of this patent is extended or adjusted under 35 U.S.C. 154(b) by 0 days.

(21) Appl. No.: 13/303,894

(22) Filed: Nov. 23, 2011

(51) Int. Cl.
    *G06F 7/04* (2006.01)
    *G06F 21/32* (2013.01)

(52) U.S. Cl.
    CPC .................................. *G06F 21/32* (2013.01)

(58) Field of Classification Search
    CPC ... G06F 21/32; H04L 63/0861; H04L 9/3231; H04N 21/4415
    USPC ...... 726/7, 168, 186; 713/186, 168; 382/118
    See application file for complete search history.

(56) References Cited

U.S. PATENT DOCUMENTS

| | | | | |
|---|---|---|---|---|
| 8,352,730 B2 * | 1/2013 | Giobbi | ..................... | G06F 21/32 713/155 |
| 8,886,954 B1 * | 11/2014 | Giobbi | ..................... | G06F 21/32 713/153 |
| 8,977,861 B2 * | 3/2015 | White | ..................... | G06F 21/32 713/186 |
| 2002/0174344 A1 * | 11/2002 | Ting | ..................... | G06F 21/32 713/185 |
| 2002/0174346 A1 * | 11/2002 | Ting | ..................... | G06F 21/32 713/186 |
| 2002/0174347 A1 * | 11/2002 | Ting | ..................... | G06F 21/32 713/186 |
| 2002/0174348 A1 * | 11/2002 | Ting | ..................... | G06F 21/32 713/186 |
| 2006/0075224 A1 * | 4/2006 | Tao | ..................... | 713/164 |
| 2006/0143441 A1 * | 6/2006 | Giobbi | ..................... | G06F 21/32 713/155 |
| 2007/0003111 A1 * | 1/2007 | Awatsu et al. | ..................... | 382/115 |
| 2007/0177771 A1 * | 8/2007 | Tanaka et al. | ..................... | 382/115 |
| 2007/0260883 A1 * | 11/2007 | Giobbi et al. | ..................... | 713/168 |
| 2008/0034219 A1 * | 2/2008 | Ting | ..................... | G06F 21/32 713/186 |
| 2008/0215890 A1 * | 9/2008 | Buer | ..................... | 713/186 |
| 2009/0100270 A1 * | 4/2009 | Ting | ..................... | 713/186 |
| 2009/0177587 A1 * | 7/2009 | Siegal et al. | ..................... | 705/67 |
| 2009/0183247 A1 * | 7/2009 | Kasper et al. | ..................... | 726/7 |
| 2009/0228968 A1 * | 9/2009 | Ting | ..................... | G06F 21/32 726/8 |
| 2010/0077224 A1 * | 3/2010 | Milgramm | ..................... | 713/186 |
| 2010/0216429 A1 * | 8/2010 | Mahajan | ..................... | 455/411 |

(Continued)

OTHER PUBLICATIONS

STIC Search Report and Strategy (received Aug. 1, 2017).*

*Primary Examiner* — Sharon Lynch (57) ABSTRACT

A computing device configured for authenticating a remote computing device is described. The computing device includes a processor and executable instructions stored in memory that is in electronic communication with the processor. The computing device detects a biometric device on the remote computing device. The computing device also obtains information regarding the biometric device on the remote computing device. The computing device further sends a utility to the remote computing device. The computer device additionally receives biometric input from the remote computing device. The computing device furthermore validates the biometric input received. The computing device also grants or denies access to the remote computing device based on the validation of the biometric input.

17 Claims, 8 Drawing Sheets

(56) References Cited

U.S. PATENT DOCUMENTS

| | | | |
|---|---|---|---|
| 2010/0257369 A1* | 10/2010 | Baker | 713/186 |
| 2011/0000961 A1* | 1/2011 | McNeal | G06Q 20/042 235/382 |
| 2011/0006881 A1* | 1/2011 | Hogaboom et al. | 340/5.83 |
| 2011/0082791 A1* | 4/2011 | Baghdasaryan | G06Q 20/10 705/44 |
| 2011/0082800 A1* | 4/2011 | Baghdasaryan | G06Q 20/10 705/75 |
| 2011/0082801 A1* | 4/2011 | Baghdasaryan | G06Q 20/10 705/75 |
| 2011/0082802 A1* | 4/2011 | Baghdasaryan | G06Q 20/10 705/75 |
| 2011/0083016 A1* | 4/2011 | Kesanupalli | G06Q 20/10 713/180 |
| 2011/0083018 A1* | 4/2011 | Kesanupalli | G06Q 20/10 713/186 |
| 2011/0083170 A1* | 4/2011 | Kesanupalli | G06Q 20/10 726/5 |
| 2011/0083173 A1* | 4/2011 | Baghdasaryan | G06Q 20/10 726/7 |
| 2011/0138450 A1* | 6/2011 | Kesanupalli | G06Q 20/10 726/7 |
| 2011/0185413 A1* | 7/2011 | Fujii et al. | 726/7 |
| 2011/0314530 A1* | 12/2011 | Donaldson | 726/7 |
| 2012/0029972 A1* | 2/2012 | Jamshidi | 705/7.29 |
| 2012/0140993 A1* | 6/2012 | Bruso et al. | 382/118 |
| 2012/0185397 A1* | 7/2012 | Levovitz | 705/71 |
| 2012/0185932 A1* | 7/2012 | Stougaard et al. | 726/16 |
| 2012/0323742 A1* | 12/2012 | Jamshidi | 705/27.1 |
| 2016/0171200 A1* | 6/2016 | Giobbi | G06F 21/32 713/186 |

\* cited by examiner

IDENTIFYING A REMOTE IDENTITY REQUEST VIA A BIOMETRIC DEVICE

TECHNICAL FIELD

The present disclosure relates generally to computers and computer-related technology. More specifically, the present disclosure relates to identifying a remote identity request via a biometric device.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. On a network, one or more servers may provide data, services and/or may be responsible for managing other computers. A computer network may include hundreds or even thousands of computers.

Most companies have one or more computer networks and also make extensive use of the Internet. The productivity of employees often requires human and computer interaction. Improvements in computers and software have been a force for bringing about great increases in business and industrial productivity as well as in the area of computer security.

As the use of computers has increased, so has the amount of data generated and used by computers. With increased data generation and use, the need to protect and secure data has also increased. For example, data may include personal information, trade secrets or sensitive information that is not meant to be accessible to the public.

DETAILED DESCRIPTION

A computing device configured for authenticating a remote computing device is described. The computing device includes a processor and executable instructions stored in memory that is in electronic communication with the processor. The computing device detects a biometric device on the remote computing device. The computing device also obtains information regarding the biometric device on the remote computing device sends a utility to the remote computing device. The computing device additionally receives biometric input from the remote computing device. The computing device also validates the biometric input received. The computing device further grants or denies access based on the validation of the biometric input.

The computing device may also establish a secure connection to the remote computing device. Sending and receiving may be performed via the secure connection. Also, detecting the biometric device on the remote computing device may include scanning the remote computing device for the biometric device.

The utility may communicate with an application programming interface (API) of the biometric device on the remote computing device. The utility may execute a command on the remote computing device. The command may be to perform a biometric authentication challenge. The utility sent to the remote computing device may comprise a user interface. The utility may perform a biometric authentication challenge on the remote computing device. The biometric input may be received as a result of the biometric authentication challenge. The biometric input may comprise a biometric profile.

A method for authenticating a remote computing device is also described. The method includes detecting a biometric device on the remote computing device. The method also includes obtaining information regarding the biometric device on the remote computing device. The method additionally includes sending a utility to the remote computing device. The method further includes receiving biometric input from the remote computing device. The method also includes validating the biometric input received. The method furthermore includes granting or denying access based on the validation of the biometric input.

A non-transitory tangible computer-readable medium for authenticating a remote computing device is also described. The computer-readable medium includes instructions for detecting a biometric device on the remote computing device. The computer-readable medium further includes instructions for obtaining information regarding the biometric device on the remote computing device. The computer-readable medium additionally includes instructions for sending a utility to the remote computing device. The computer-readable medium also includes instructions for receiving biometric input from the remote computing device. The computer-readable medium further includes instructions for validating the biometric input received. The computer-readable medium furthermore includes instructions for granting or denying access based on the validation of the biometric input.

The systems and methods disclosed herein may allow for authenticating a remote computing device, such as a client computing device. The systems and methods disclosed herein may use both hardware and/or software interfaces to authenticate a remote computing device.

Authentication requirements are becoming increasingly common to be able to gain access to data and services. A user may authenticate in three primary ways. First, a user may physically possess an object that allows access. For example, a user may have a key that unlocks a door or an access card that grants access to restricted space. Second, a user may have knowledge required to authenticate. For example, the user may have knowledge of a password, a passphrase or a personal identification number. Lastly, a user may possess unique physical attributes to authenticate. For example, a user's fingerprint, voice print or eye scan may uniquely identify and authenticate a user. This third type of authentication is referred to as biometrics or biometric authentication. Other types of biometrics include facial recognition, fingerprint identification, hand geometry biometrics, an iris scan, a retina scan, signature dynamics, voice analysis and DNA analysis.

When a remote computing device, such as a client, desires to access data or services from a computing device, such as a host, authentication is often required. Typically, users authenticate using methods where the user must possess knowledge, such as a password. However, this method can present a variety of problems. For example, a password may be guessed by another user, insecurely transmitted, obtained by another, cracked by a computing device, etc. Users desiring a secure password must remember long and hard to remember strings of random characters and numbers. This password must be changed regularly to ensure it is not compromised. Further, a changed password should be drastically different from a previously used password. Additionally, different passwords for different types of data or services should be employed to add further protection. Maintaining multiple passwords and changing them regularly can be very difficult to sustain. Alternatively, a user may choose to use a simple or short password. However, a simple to remember password used for data and services may be easily compromised and may result in disclosing personal user data and other information that the user desires to keep private.

As an alternative to requiring users to retain multiple long, complex passwords, biometrics have started to be used as a means of authentication. Each biometric, such as a fingerprint or an iris scan, is unique and does not require the user to possess additional objects or retain arbitrary pieces of knowledge. Additionally, biometric authentication can be difficult to replicate or duplicate.

Thus, employing biometric authentication for a client to access data or services on a host may be beneficial. For example, a client desiring to access a specific service on a network may send biometric input from a user to a host to verify the identity of the user. Upon validation, the host may grant the client access to the network, network data and/or services.

As another example, a user on a client desiring to access their personal data stored on the Internet (e.g., a host server) may use biometrics to authenticate his or her identity. This may allow the user, and only the user, to access their personal data. Thus, this may prevent problems of social hacking or impersonation over various types of communication mediums.

In one configuration, a computing device or host may use biometrics to verify and/or challenge the qualifications of a user on a client or remote computing device. For example, a host computer may challenge a user on a client to send biometric data to be validated by the host. In some instances, the client may be a laptop, a mobile device (e.g., cell phone) or other computing device equipped with a biometric input device, such as a fingerprint scanner. The host may detect the type of biometric device located on the client. In some cases, the host may control the biometric input device on the client. The host may receive biometric input from the client and validate the input. Based on the validation, the host may grant or deny access to the client to the requested data or services.

In some configurations, the client may request access to a service on the host computer. The host and the client may establish a secure connection with each other. The host may detect the presence of a biometric device on the client. For example, the host may scan the client for biometric hardware. Additionally or alternatively, the host may request information regarding biometric devices on the client. The host may receive information collected from the client, for example via a device detection scan, and use that information to determine the specifics of the biometric device at the client. With this information, the host may determine various options available that may be employed to verify a biometric authentication challenge.

In other configurations, the host may send a utility to the client. The utility may be based on the information received from the client. For example, the utility may include information regarding a fingerprint scanning biometric device located on the client. The host may push the proper utilities down to the client, for example, through a secure connection. Once the utility is on the client, the host may initiate a remote execute to the utility on the client. The host may wait for the return information or a biometric input to be received. In some instances, the utility may be used in connection with LANDesk Management Suite to manage the device locally and/or remotely.

In another configuration, the utility sent from the host to the client may call the application programming interface (API) of the biometric device on the client. For example, this may be to initiate the authentication. As another example, the host may determine information regarding the biometric device and its API, use this information to choose an appropriate utility and send commands over in a utility to perform the biometric authentication challenge. In some cases, the utility may launch a User Interface (UI) on the client. For instance, the host may send over to the client a utility that includes an UI and preforms biometric authentication verification. The results of the verification may be sent back to the host. For example, a return code or status of the attempt to authenticate may be returned. Additionally or alternatively, biometric input may be sent to the host to perform remote verification.

In one configuration, the host may require a biometric authentication challenge in addition to another type of challenge. For example, the host may require a password and a fingerprint scan verification before access is granted.

In some configurations, a biometric profile may be generated on the client. For example, a biometric profile may include user credentials and/or one or more biometric inputs. The biometric profile may be verified on the client computer or sent to the host to be verified. Once the host has validated the results of the biometric authentication challenge, the host may display the returned results of the remote request to authenticate to the client. Additionally or alternatively, the host may display the results to a third party. For example, the host may send the results to a log or database such that a third party may observe and track access granted to users.

In another configuration, the client may request access to data located on or controlled by the host. The host may send a utility to the client to perform a biometric authentication challenge. The utility may command the client to execute the challenge without knowledge of the user. For example, the host may use a biometric device such as a camera to perform a facial recognition scan of the user on the client. The client may return the biometric input to the host. Upon validation, the host may grant access to the data requested. Upon denial, the host may request another validation challenge, deny access, notify a third party and/or log the user's attempt to access the requested data.

Various configurations of the systems and methods are now described with reference to the figures, where like reference numbers may indicate identical or functionally similar elements. The configurations of the present systems and methods, as generally described and illustrated in the figures herein, could be arranged and designed in a wide variety of different configurations. Thus, the following more detailed description of several configurations, as represented in the figures, is not intended to limit the scope of the systems and methods as claimed but is merely representative of the various configurations of the systems and methods.

Figure 1:
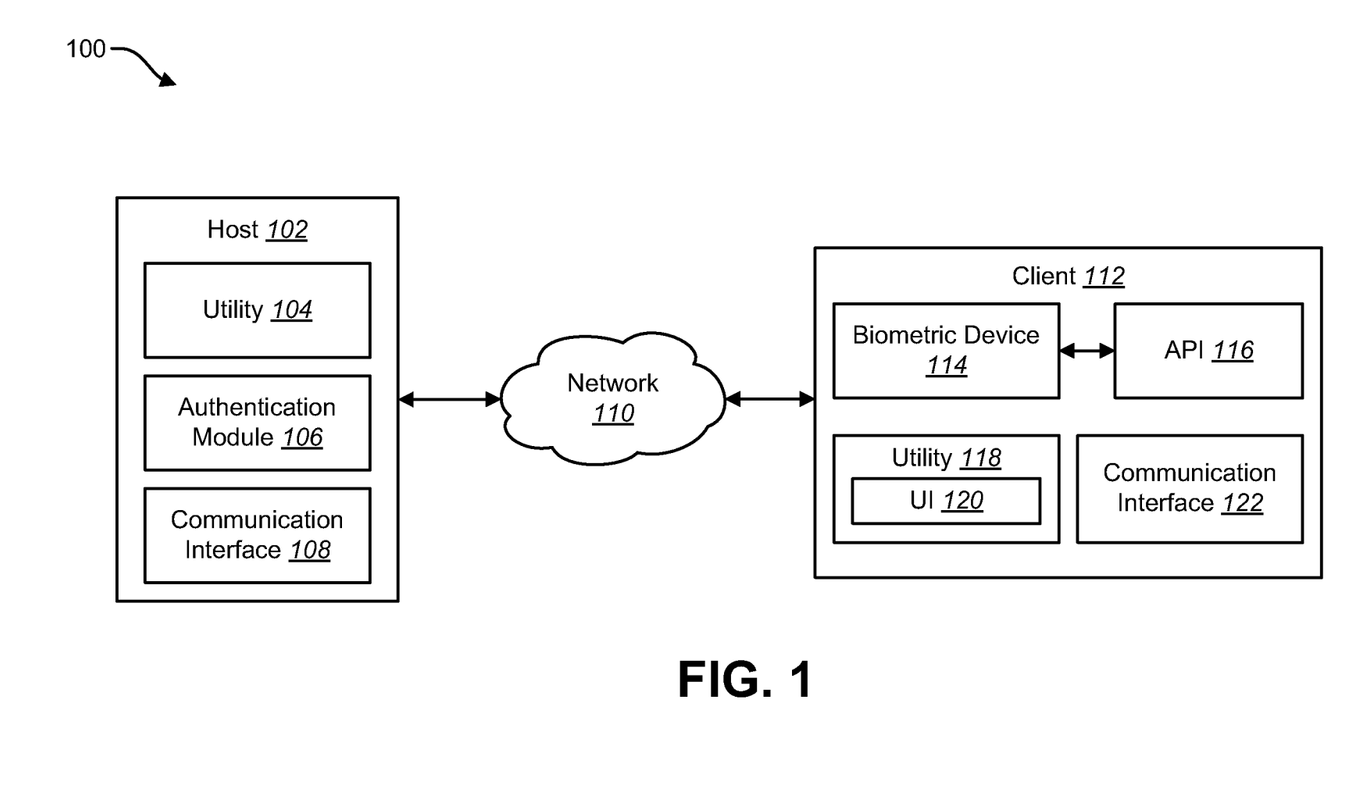
FIG. 1 is a block diagram illustrating one configuration of a system for authenticating a client.

FIG. 1 is a block diagram illustrating one configuration of a system 100 for authenticating a client. Examples of the host 102 and/or client 112 include desktop computers, laptop computers, servers, supercomputers, smartphones, tablet devices, game consoles, e-readers and/or other devices that include memory and a processor. In some configurations, the host 102 may be a computing device and the client 112 may be a remote computing device. In another configuration, the host 102 may be an administrative system and the client 112 may be a managed node.

The host 102 may include a utility 104, an authentication module 106 and a communication interface 108. As used herein, a "module" or "engine" may be implemented in hardware, software or a combination of both. For example, the authentication module 106 may be implemented in hardware, software or a combination of hardware and software. In one instance, the host 102 may be used in connection with LANDesk Management Suite.

The utility 104 may be used to determine the presence of a biometric device 114 on the client 112. For example, the host 102 may use the utility 104 to scan the client 112 for biometric hardware. This may occur through the communication interface 108 via a network 110. For example, the network may be a local area network (LAN), wireless LAN (WLAN), municipal area network (MAN), wide area network (WAN), the Internet, etc. In some configurations, the host 102 and the client 112 may be a connected via a secure connection. The utility 104 may also send a utility to the client 112. This will be discussed below in greater detail.

The host 102 may also include an authentication module 106. The authentication module 106 may establish and/or validate biometric authentication challenges. For example, the client 112 may send biometric input to the host 102 for the authentication module 106 to validate. The authentication module 106 may grant or deny access to data or services requested by the client 112.

The client 112 may include a biometric device 114, an API 116, a utility 118 and communication interface 122. The biometric device 114 may include both hardware and firmware components. Additionally, the biometric device 114 may also include software. Types of biometric devices 114 include facial recognition, fingerprint identification, hand geometry biometrics, an iris scan, a retina scan, signature dynamics, voice analysis, etc. The biometric device 114 may be in communication with an API 116. The API 116 may provide commands, functions, definitions, protocols, data structures, etc. that the biometric device 114 may employ. For example, the API 116 may allow the host 102 to perform a biometric authentication challenge using the biometric device 114 on the client 112.

The utility 118 on the client 112 may include a utility 104 sent from the host 102. In some cases, the utility 118 on the client 112 may work in connection with the utility 104 located on the host 102. For example, the host 102 may send a utility 104 to the client 112 and the client 112 may store the utility 104 as utility 118. In other cases, the client 112 may combine the utility 104 received from the host 102 with a utility 118 already present on the client 112.

In another configuration, the client 112 may also include an application (not shown). The utility 104 sent from host 102 may include commands to operate the application on the client 112. For example, the utility 104 sent from host 102 may command the application to perform a biometric authentication challenge. Additionally or alternatively, the utility 118 on the client 112 may itself be an application that includes a utility 104 sent from the host 102.

The utility 118 on the client 112 may include a user interface (UI) 120. The UI 120 may assist a user in performing a biometric authentication challenge. In some instances, the UI 120 may be part of the utility 104 send from the host 102. For example, the host 102 may send a utility 104 to the client 112 including a UI 120. The UI 120 may guide a user through the process of performing a biometric authentication challenge. For instance, the UI 120 may notify a user that a biometric authentication challenge is required. The utility 118 may communicate with the API 116 to conduct a biometric authentication challenge and receive a biometric input from the user, such as a fingerprint. The UI 120 may instruct and alert the user of steps required to complete the biometric authentication challenge. Once the challenge is complete, the client 112 may send the biometric input received from a user to the host 102. The client 112 may use the communication interface 108 to communicate with the host 102 over a network 110 connection.

Figure 2:
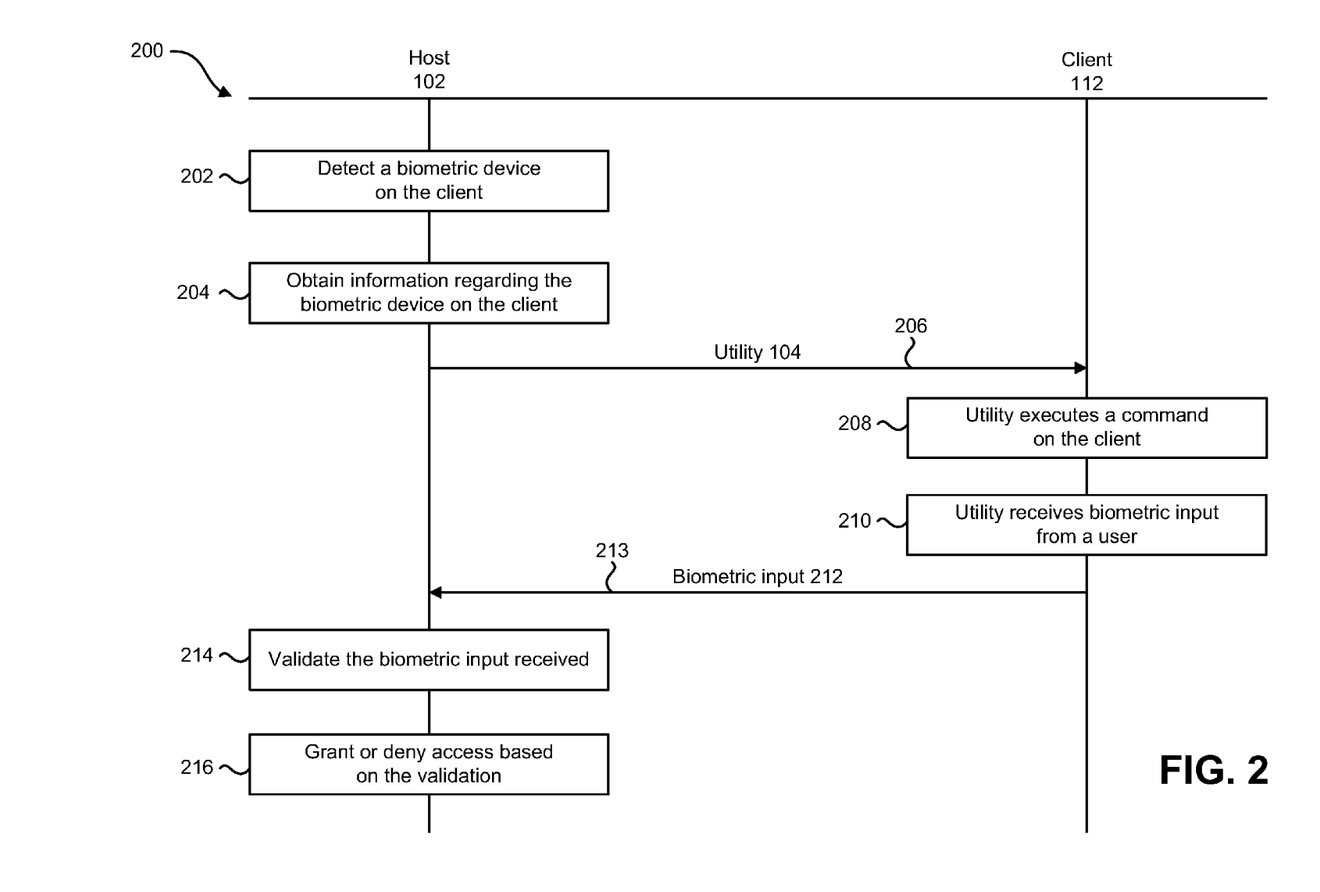
FIG. 2 is a diagram illustrating one method for authenticating a client.

FIG. 2 is a diagram illustrating one method 200 for authenticating a client 112. A host 102 may detect 202 a biometric device on the client 112. The host 102 may obtain 204 information regarding the biometric device 114 on the client 112. For example, the host 102 may detect a fingerprint scanning biometric device 114 on the client 112. The host 102 may send 206 a utility 104 to the client 112. The utility 104 may be stored on the client 112 as utility 118.

On the client 112, the utility 118 may execute 208 a command. For example, the utility 118 may command the biometric device 114 to perform a biometric authentication challenge. A user may participate in the challenge and the utility 118 may receive 210 biometric input 212 from the user. The biometric input 212 may be sent 213 from the client 112 to the host 102. At the host 102, the biometric input 212 may be validated 214. If the validation is successful the host 102 may grant 216 access based on a successful validation. Alternatively, the host 102 may deny 216 access bases on a failed validation.

Figure 3:
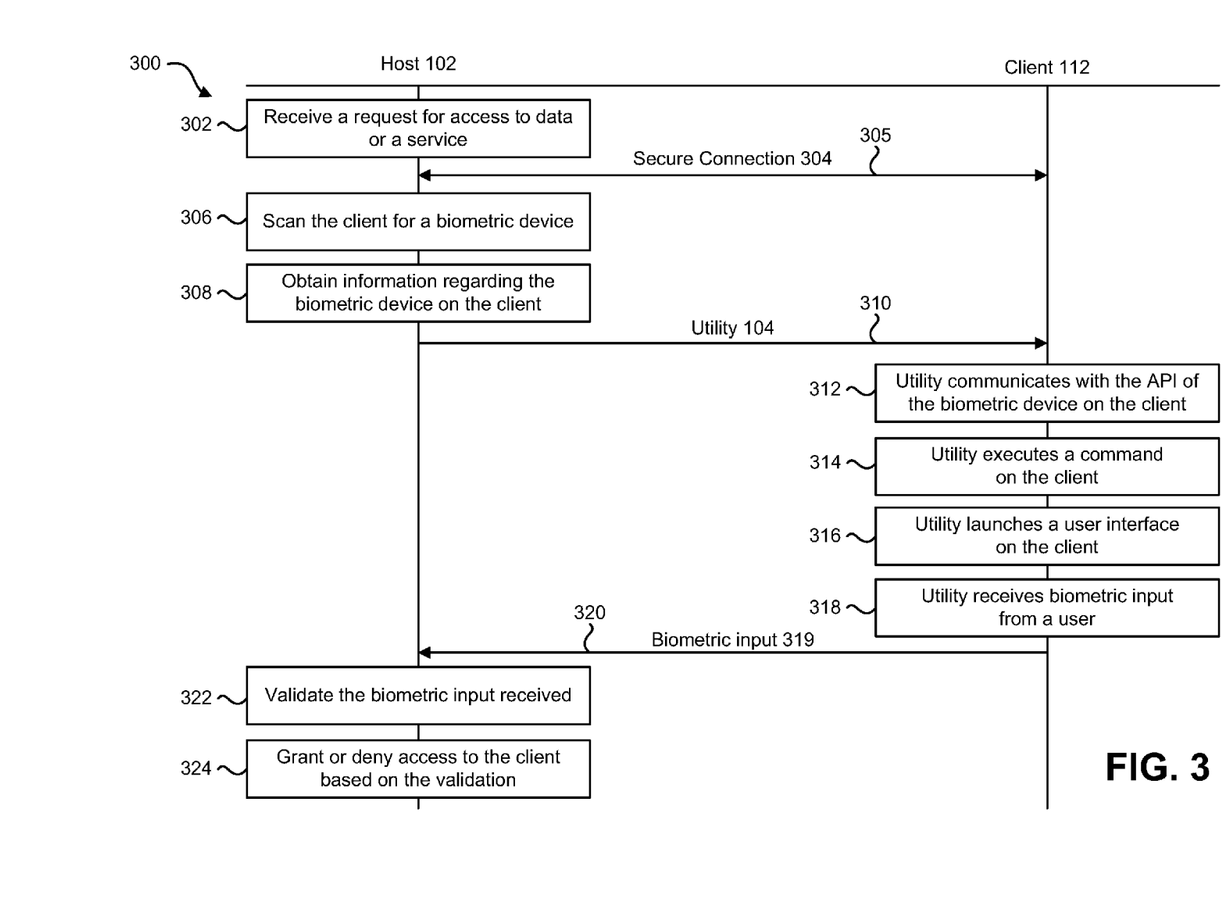
FIG. 3 is a diagram illustrating another method for authenticating a client.

FIG. 3 is a diagram illustrating another method 300 for authenticating a client 112. The host 102 may receive 302 a request for access to data or a service from the client 112. The host 102 and the client 112 may establish 305 a secure connection 304 with each other. The secure connection 304 may be established 305 at initial contact or subsequently between the host 102 and the client 112.

The host 102 may scan 306 the client 112 for a biometric device 114. Information regarding the biometric device 114 on the client 112 may be obtained 308 by the host 102. For example, the host 102 may request information regarding biometric devices 114 on the client 112. This information may be used by the host 102 to perform a biometric authentication challenge. For example, the host 102 may obtain 308 information from the client 112 regarding a fingerprint scanning biometric device 114. For instance, the utility 104 on the host 102 may use this information to generate a utility 104 to send 310 to the client 112.

The utility 118 on the client 112 may communicate 312 with the API 116 of the biometric device 114 on the client 112. For example, the utility 118 may execute 314 a command on the client 112 using the API 116 commanding the biometric device 114 to perform a biometric authentication challenge. Additionally and/or alternatively, the host 102 may push a command to the utility 118 on the client 112. For example, the host 102 may push a command to execute a biometric authentication challenge on the client 112.

In some configurations, the utility 118 launches 316 a UI 120 on the client 112. The UI 120 may instruct and assist a user in performing a biometric authentication challenge. In some cases, the UI 120 may be a specific UI 120 sent from the host 102 via the utility 104. For example, a user on desiring to log onto a social networking website located on a social networking host 102 may request 302 access to their data and/or services offered. The social networking host 102 may send a utility 104 comprising a UI 120 to the client 112. For example, the UI 120 may be specialized and display the name, logo, etc. of the host 102 and assist the user in performing a biometric authentication challenge using the biometric device 114 located on the client 112. Alternatively, the UI 120 may be a generic UI stored on the utility 118 of the client 112 and used with multiple hosts 102.

The utility 118 on the client 112 may receive 318 biometric input 319 from a user. The biometric input 319 may be sent 320 to the host 102 from the client 112. Data, the utility 104, biometric input 319, etc. may be sent and received between the host 102 and the client 112 over the secure connection 304.

The host 102 may validate 322 the biometric input 319 received. Validation 322 may occur by comparing the biometric input 319 received to biometric data stored on the host 102. For example, the host may compare the fingerprint sent from the client 112 to a fingerprint in a database stored on the host 102. In this manner, a user may authenticate biometrically from different clients as long as each client includes a comparable biometric device. Access may be granted or denied 324 to the client 112 based on the validation.

The systems and methods described herein may also be beneficial in a managed environment. For example, a user desiring access to a computing device, to specialized office equipment and/or to gain physical access to a restricted area may use a fingerprint to gain access. Each client 112 (e.g., a computer, office equipment, etc.) may communicate with and be validated by the same host 102. In this way, a controlled environment may regulate access to data and services through the use of remote biometric identity authentication.

As another benefit, an administrator may notify a host 102 that a user no longer has authority to access a client 112, database, service, restricted area, etc. The user will then be denied 324 access based on a biometric validation challenge. Similarly, an administrator may add or restrict privileges on a host 102 to grant or deny 324 privileges to a user.

Figure 4:
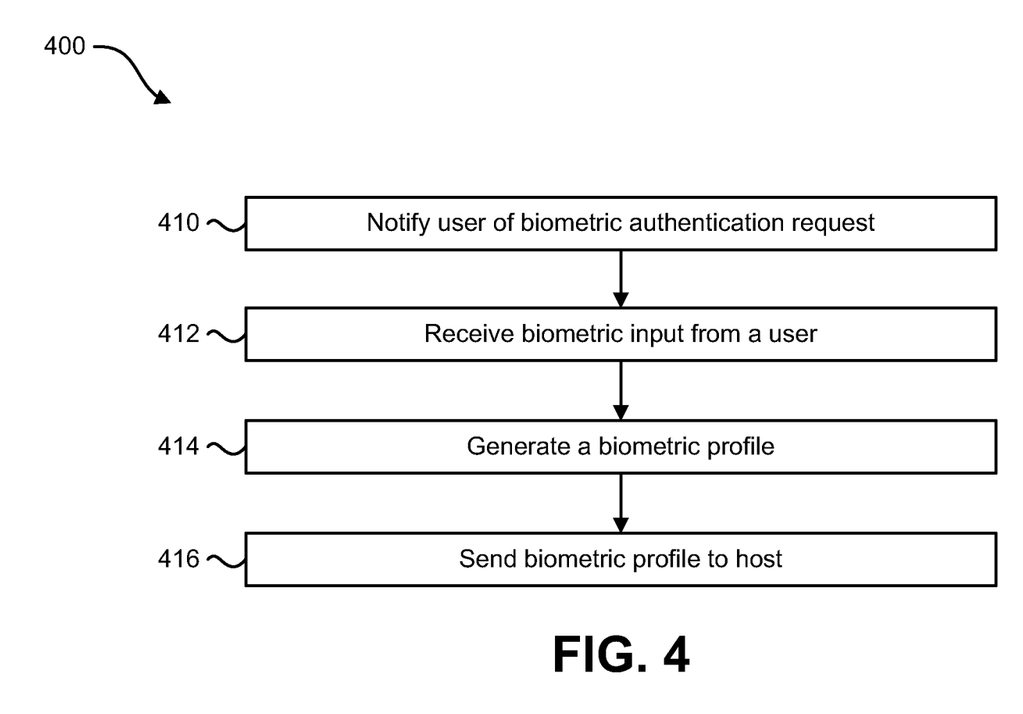
FIG. 4 is a flow diagram illustrating a more specific configuration of a method for generating and sending a biometric profile.

FIG. 4 is a flow diagram illustrating a more specific configuration of a method 400 for generating and sending a biometric profile. The utility 104 sent from the host 102 to the client 112 may instruct the client 112 on how to perform the biometric authentication or biometric identification challenge. For example, the utility 104 may command the client 112 to notify 410 the user of a biometric authentication request or challenge. The client 112 may receive 412 biometric input from a user. The utility 118 may generate 414 a biometric profile, such as, for instance, a user's credentials in connection with one or more biometric inputs from the user. For example, the generation may occur using the utility 118 on the client 120. The biometric profile may be sent 416 to the host 102 for validation. Additionally or alternatively, the biometric input may be sent 416 to the host 102 and the host 102 may generate 414 a biometric profile.

Figure 5:
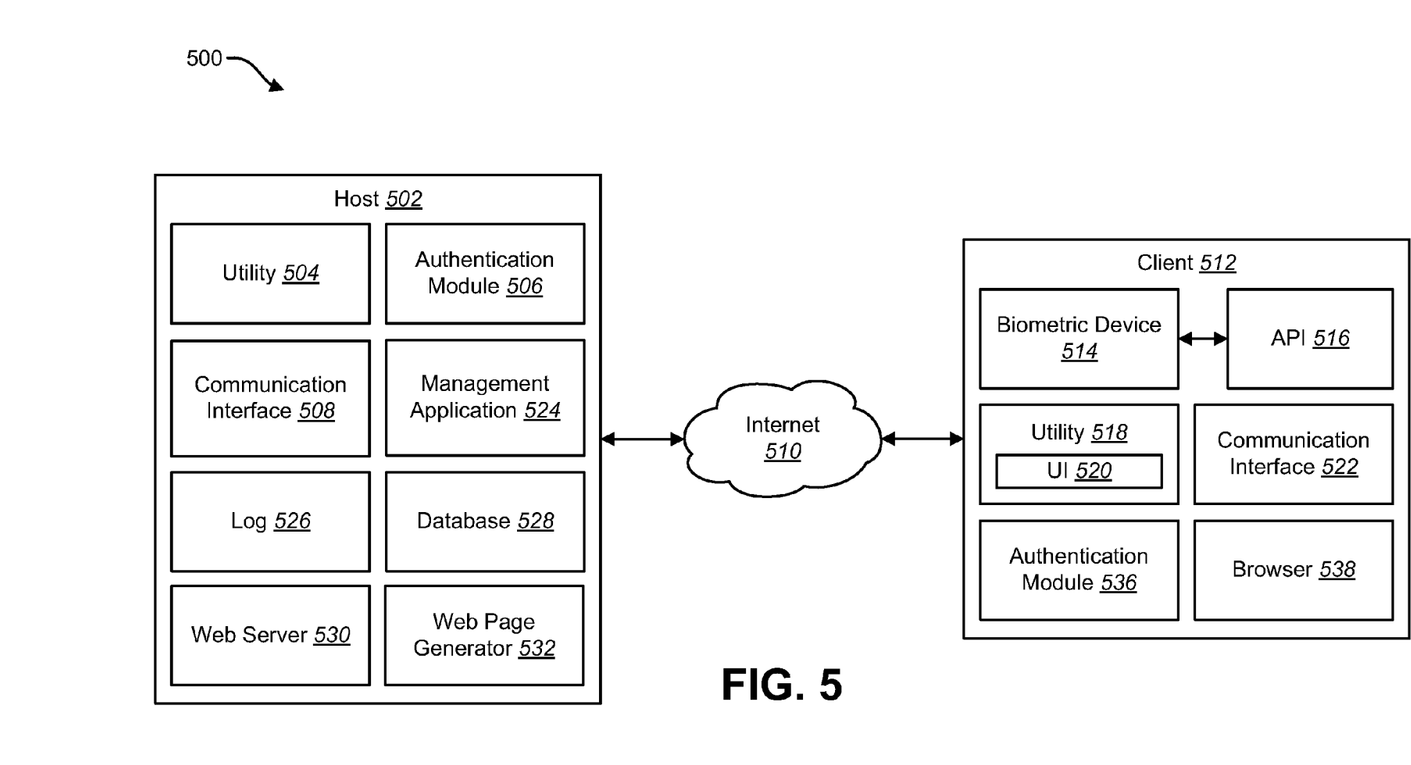
FIG. 5 is a block diagram illustrating another configuration of a system that may be utilized in connection with systems and methods for authenticating a client.

FIG. 5 is a block diagram illustrating another configuration of a system 500 that may be utilized in connection with systems and methods for authenticating a client 512. The host 502 may include a utility 504, authentication module 506 and communication interface 508 similar to components 104, 106 and 108 described above in connection with FIG. 1. The host 502 may be connected to a network, such as the Internet 510.

In one configuration, the host 502 includes a management application 524. The management application 524 may manage or control one or more clients 512. For example, the management application 524 may provide functionality regarding user rights. The management application 524 may record a user's attempt to authenticate in a log 526 and may store user information, attributes and characteristics in a database 528. The log 526 may be accessible by a third party, such as a system administrator. The database 528 may store data regarding users, privilege levels as well as clients (including the client 512 shown in FIG. 5) and/or accessible data and services. For example, the database 528 may include profiles of users on a social networking website located on the host 502. The database 528 may be a composed of a group of connected databases.

In another configuration, the host 502 includes a web server 530 and a web page generator 532. For example, if the host 502 is a social networking site, the web server 530 may employ the web page generator 532 to serve web pages to the client 512 via the Internet 510.

The client 512 may include a biometric device 514, an API 516 for the biometric device 514, a utility 518 with a UI 520 and a communication interface 522 similar to components 114, 116, 118, 120 and 122 described above in connection with FIG. 1. The client 512 may be connected to a network, such as the Internet 510.

In some configurations, the client 512 includes an authentication module 536. The authentication module 536 may assist the utility 518 in verifying biometric input from a user. This will be discussed in greater detail below in connection with FIG. 6.

The client 512 may also include a browser 538 to access web pages. For example, the browser 538 may view web pages generated by a web page generator 532 and served by a web server 530 from a host 502.

In some instances, the host 502 may send the utility 518 to the client 512 to perform a biometric authentication challenge. The utility 518 may provide instructions to have the challenge performed via the browser 538. For example, the utility 518 may provide a UI 520 that interfaces with the browser 538 and performs the challenge using the biometric device 514 of the client 512.

Figure 6:
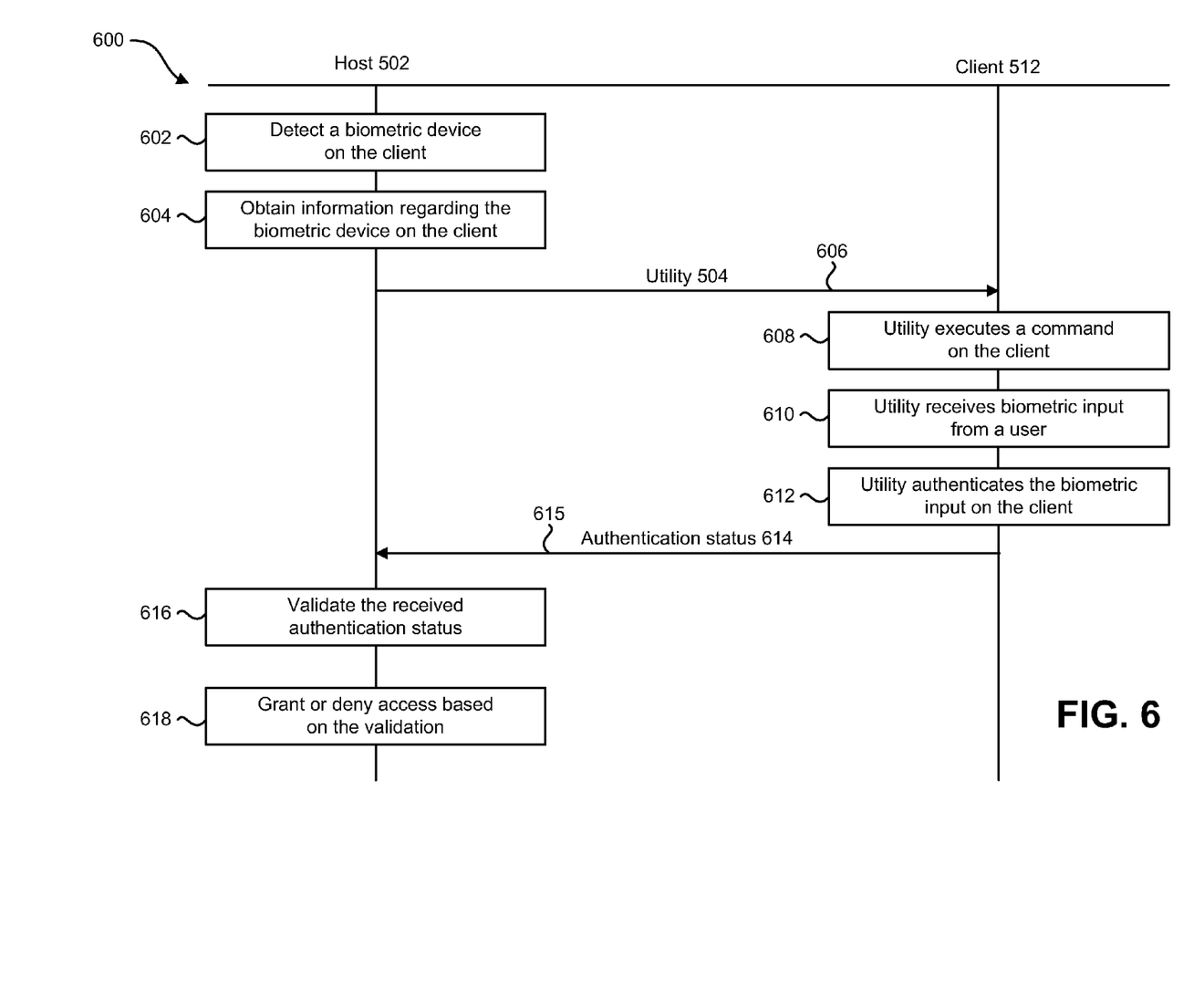
FIG. 6 is a diagram illustrating another configuration of a method for authenticating a client.

FIG. 6 is a diagram illustrating another configuration of a method 600 for authenticating a client. The host 502 may detect 602 a biometric device 514 on the client 512. The host 502 may obtain 604 information regarding the biometric device 514 on the client 512. A utility 504 may be sent 606 to the client 512. The utility 504 may be generated on the host 502. On the client 512, the utility 518 may execute 608 a command. For example, the utility 518 may instruct the client 512 to perform a biometric authentication or biometric identification challenge. The utility 518 may receive 610 biometric input from a user.

The utility 518 may use the authentication module 536 on the client 512. For example, the utility 518 may execute 608 a command on the client 512 to perform a biometric authentication challenge. In some configurations, the utility 518 may provide instructions to the authentication module 536 on how to authenticate 612 the biometric input. For example, the host 502 may provide authenticated data via the utility 504 for the authentication module 536 to authenticate 612 the biometric input. For instance, the host 602 may provide the user's fingerprint, data regarding the fingerprint (e.g., a hash of the user's fingerprint), etc. to the authentication module 536 to allow the client to authenticate 612 the biometric input. In this manner, the client 512 performs the computations necessary to authenticate 612 the biometric authorization challenge. While the client 512 may be utilized in this approach to authenticate 612 the biometric input, the authentication process is independent of the client used and may be performed on multiple clients. In other words, while the host 502 uses the biometric device 514 and possibly even the processor of the client 512, the host 502 still controls the remote validation process.

Once authentication 612 is performed by the authentication module 536 on the client 512. The authentication status 614 may be sent 615 to the host 502. For example, the client 512 may send a return code or the status of the attempt to authenticate 612. In some instances, this may be handled by the utility 518. The host 502 may validate 616 the received authentication status 614. Based on the validation, the host 502 may grant or deny 618 access to the requested services or data.

Figure 7:
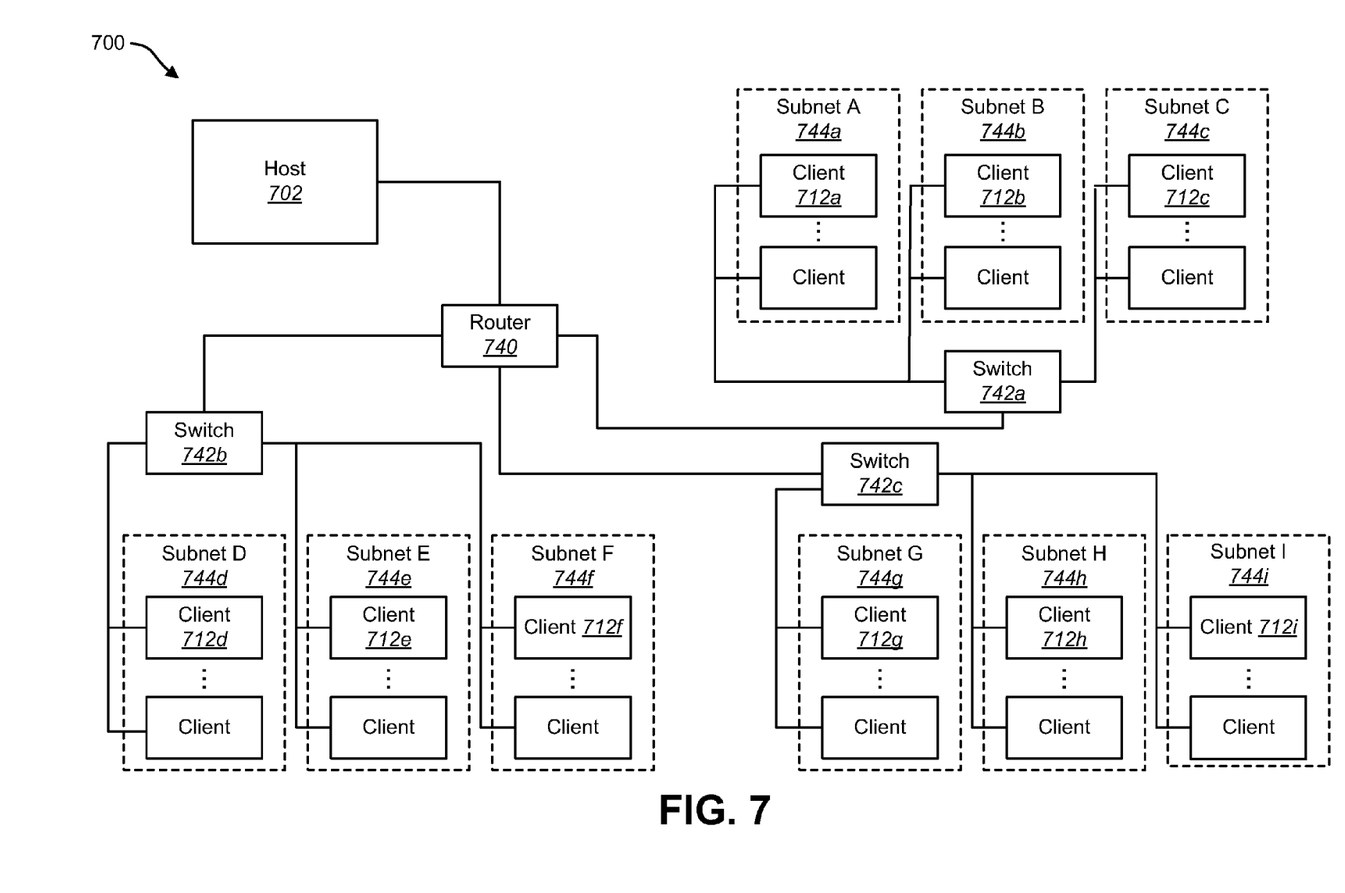
FIG. 7 is a block diagram illustrating a configuration of a network where systems and methods for authenticating a client may be implemented.

FIG. 7 is a block diagram illustrating a configuration of a network 700 where systems and methods for authenticating a client 712 may be implemented. A host 702 (e.g., computing device and/or administrative system) may be connected to a router 740. The router 740 may be connected to switches 742a, 742b, 742c. The switch 742a may be connected to several clients (e.g., managed nodes) 712a, 712b, 712c, etc., via their respective subnets 744a, 744b, 744c. The switch 742b may be connected to several clients 712d, 712e, 712f, etc., via their respective subnets 744d, 744e, 744f. The switch 742c is connected to several clients 712g, 712h, 712i, etc., via their respective subnets 744g, 744h, 744i. Although FIG. 7 only shows one router 740, and a limited number of switches 742, subnets 744 and clients 712, many and varied numbers of routers 740, switches 742, subnets 744 and clients 712 may be included in networks and/or systems where methods and systems for authenticating a client may be implemented. It should be noted that the host 702 illustrated in FIG. 7 may be configured similarly to the host 102, 502 described above. It should also be noted that the clients 712 illustrated in FIG. 7 may be configured similarly to the clients 112, 512 described above.

Figure 8:
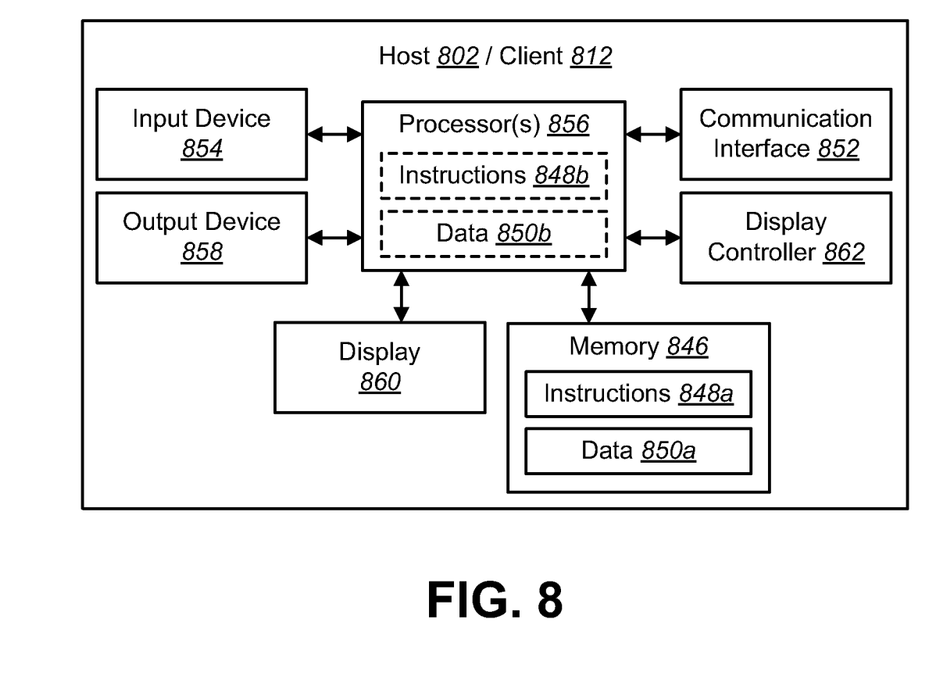
FIG. 8 illustrates various components that may be utilized in a host (e.g., computing device) and/or client (e.g., remote computing device).

FIG. 8 illustrates various components that may be utilized in a host 802 (e.g., computing device) and/or client (e.g., remote computing device) 812. The illustrated components may be located within the same physical structure or in separate housings or structures.

The host 802 or client 812 may include one or more processor(s) 856 and memory 846. The memory 846 may include instructions 848a and data 850a. The processor 856 controls the operation of the host 802 or client 812 and may be, for example, a microprocessor, a microcontroller, a digital signal processor (DSP) or other device known in the art. The processor 856 may be in electronic communication with the memory 846. The processor 856 typically performs logical and arithmetic operations based on program instructions 848b and/or data 850b it loads from the memory 846.

The host 802 or client 812 typically may include one or more communication interfaces 852 for communicating with other electronic devices. The communication interfaces 852 may be based on wired communication technology, wireless communication technology or both. Examples of different types of communication interfaces 852 include a serial port, a parallel port, a Universal Serial Bus (USB) port, an Ethernet adapter, an IEEE 1394 bus interface, a small computer system interface (SCSI) bus interface, an infrared (IR) communication port, a Bluetooth wireless communication adapter, a network storage device, an external hard drive, an optical drive (e.g., Compact Disc (CD) drive, Digital Video Disc (DVD) drive, Blu-ray drive, etc.) and so forth.

The host 802 or client 812 typically may include one or more input devices 854. Examples of different kinds of input devices 854 include a keyboard, mouse, microphone, remote control device, button, joystick, trackball, touchpad, lightpen, camera and/or other input device 854. The input device 854 may receive input from another device and/or from a user of the host 802 or client 812. The input device 854 may comprise multiple devices, blocks and/or modules that the host 802 or client 812 may use to receive information. For instance, an input device 854 may be an Ethernet card that can receive information from another computing device connected to a network 110, 510. In another example, the input device 854 may be a computer mouse that may be used by the host 802 or the client 812 to detect user interaction such as a "click" on an icon and/or translation of a cursor.

The host 802 or client 812 typically may include one or more output devices 858. Examples of different kinds of output devices 858 include displays, projectors, speakers, tactile devices, network cards, wireless transmitters, infrared transmitters, lights, etc. The output device 858 may output, transmit, send, display, project, emit and/or convey information to another device and/or to a user of the host 802 or client 812. For instance, the output device 858 may be a monitor that can display information (e.g., images) to a user. In another example, the output device 858 may be a network card that can transmit information to another computing device connected to a network. In some configurations, the output device 858 may display a graphical user interface (GUI) to facilitate user interaction. For example, the client 812 may display a window with icons that a user may interact with using a keyboard and/or mouse (e.g., "keyboard/mouse").

One specific type of output device that may typically be included in a host 802 or client 812 is a display device 860. Display devices 860 used with configurations disclosed herein may utilize any suitable image projection technology, such as a cathode ray tube (CRT), liquid crystal display (LCD), light-emitting diode (LED), gas plasma, electroluminescence or the like. A display controller 862 may also be provided for converting data 850a stored in the memory 846 into text, graphics and/or moving images (as appropriate) shown on the display device 860.

Of course, FIG. 8 illustrates only one possible configuration of a host 802 or client 812. Various other architectures and components may be utilized.

In the above description, reference numbers have sometimes been used in connection with various terms. Where a term is used in connection with a reference number, this may refer to a specific element that is shown in one or more of the figures. Where a term is used without a reference number, this may refer generally to the term without limitation to any particular figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be non-transitory and tangible.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A host computing device configured for authenticating a mobile device, comprising:
   a processor of the host computing device;
   a memory in electronic communication with the processor;
   instructions stored in the memory, the instructions being executable to cause the processor to:
   receive a request for access to personal data from the mobile device, the mobile device being physically distinct from the host computing device and operatively coupled to the host computing device via a network;
   scan the mobile device to detect a biometric sensor on the mobile device;
   obtain information regarding a type of biometric sensor that is located on the mobile device;
   select a utility based on the type of biometric sensor that is located on the mobile device;
   cause the utility to be sent to the mobile device, wherein the utility comprises commands on how to perform a biometric authentication on the mobile device;
   send stored biometric data to the mobile device for performing the biometric authentication on the mobile device including a comparison of the stored biometric data and biometric data generated at the biometric sensor on the mobile device, wherein the biometric data generated at the biometric sensor is obtained from a user without notifying the user;
   receive a return code from the mobile device that indicates a status of the biometric authentication performed on the mobile device;
   grant or deny the mobile device access to the personal data based on the biometric authentication performed on the mobile device, wherein the host computing device grants or denies access; and
   transmit an indication of the granting or denying of the mobile device access to the personal data to a log or database for tracking access granted to users by a system administrator.

2. The host computing device of claim 1, wherein:
   the instructions are further executable to cause the processor to establish a secure connection to the mobile device, and
   the sending the stored biometric data and the receiving the return code are performed via the secure connection.

3. The host computing device of claim 1, wherein the utility communicates with an application programming interface (API) of the biometric sensor on the mobile device.

4. The host computing device of claim 1, wherein the utility sent to the mobile device comprises a user interface, and wherein the utility also comprises commands to require another type of challenge such that at least two different types of authentication challenges are performed.

5. The host computing device of claim 1, wherein the biometric authentication performed on the mobile device includes the utility performing a biometric authentication challenge on the mobile device.

6. The host computing device of claim 5, wherein the biometric data is received as a result of the biometric authentication challenge.

7. The host computing device of claim 1, wherein the stored biometric data comprises a biometric profile.

8. The host computing device of claim 1, wherein the instructions are further executable to cause the processor to restrict, using a management application on the host computing device, user authority to access at least one of a client, a database, a service, or a restricted area.

9. A method for authenticating a mobile device, comprising:
  receiving, at a host computing device, a request for access to personal data from the mobile device, the mobile device being physically distinct from the host computing device and operatively coupled to the host computing device via a network;
  scanning the mobile device to detect a biometric sensor on the mobile device;
  obtaining information regarding a type of biometric sensor on the mobile device;
  selecting a utility based on the type of biometric sensor that is located on the mobile device;
  causing the utility to be sent to the mobile device, wherein the utility comprises commands on how to perform a biometric authentication on the mobile device;
  sending stored biometric data to the mobile device for performing the biometric authentication on the mobile device including a comparison of the stored biometric data and biometric data generated at the biometric sensor on the mobile device, wherein the biometric data generated at the biometric sensor is obtained from a user without notifying the user;
  receiving a return code from the mobile device that indicates a status of the biometric authentication performed on the mobile device;
  granting or denying the mobile device access to the personal data based on the biometric authentication performed on the mobile device, wherein the host computing device grants or denies access; and
  transmitting an indication of the granting or denying of the mobile device access to the personal data to a log or database for tracking access granted to users by a system administrator.

10. The method of claim 9, further comprising establishing a secure connection to the mobile device, and wherein the sending and receiving are performed via the secure connection.

11. The method of claim 9, wherein the utility communicates with an application programming interface (API) of the biometric sensor on the mobile device.

12. The method of claim 9, wherein the utility sent to the mobile device comprises a user interface, and wherein the utility also comprises commands to require another type of challenge such that at least two different types of authentication challenges are performed.

13. The method of claim 9, wherein the biometric authentication performed on the mobile device includes the utility performing a biometric authentication challenge on the mobile device.

14. The method of claim 13, wherein the biometric data is received as a result of the biometric authentication challenge.

15. The method of claim 9, wherein the stored biometric data comprises a biometric profile.

16. A non-transitory computer-readable medium for authenticating a mobile device comprising executable instructions for:
  receiving, at a host computing device, a request for access to personal data from the mobile device, the mobile device being physically distinct from the host computing device and operatively coupled to the host computing device via a network;
  scanning the mobile device to detect a biometric sensor on the mobile device;
  obtaining information regarding a type of biometric sensor on the mobile device;
  selecting a utility based on the type of biometric sensor that is located on the mobile device;
  causing the utility to be sent to the mobile device, wherein the utility comprises commands on how to perform a biometric authentication on the mobile device;
  sending stored biometric data to the mobile device for performing the biometric authentication on the mobile device including a comparison of the stored biometric data and biometric data generated at the biometric sensor on the mobile device, wherein the biometric data generated at the biometric sensor is obtained from a user without notifying the user;
  receiving a return code from the mobile device that indicates a status of the biometric authentication performed on the mobile device;
  granting or denying the mobile device access to the personal data based on the biometric authentication performed on the mobile device, wherein the host computing device grants or denies access; and
  transmit an indication of the granting or denying of the mobile device access to the personal data to a log or database for tracking access granted to users by a system administrator.

17. The non-transitory computer-readable medium of claim 16, wherein the utility performs a biometric authentication challenge on the mobile device.

* * * * *